Aug. 3, 1954     S. E. BARTELSON     2,685,417

INSTANTANEOUS FILM MOTION FILTER

Filed July 27, 1951

INVENTOR.
STEN E. BARTELSON
BY
ATTORNEY

Patented Aug. 3, 1954

2,685,417

UNITED STATES PATENT OFFICE 2,685,417

INSTANTANEOUS FILM MOTION FILTER

Sten E. Bartelson, Birmingham, Mich., assignor to Radio Corporation of America, a corporation of Delaware Application July 27, 1951, Serial No. 238,890

7 Claims. (Cl. 242—75)

This invention relates to tape or film advancing apparatus, and particularly to a damping device for maintaining a constant or uniform motion of a tape or film at a certain point, such as a sound recording translation point.

Damping devices in film loops between a driving sprocket and a film-pulled drum are well-known, many of these devices employing a tensioning spring to tension the film in the loop and a damping element, such as friction pads, dashpots, and similar devices. A dashpot type is disclosed and claimed in my co-pending U. S. application, Ser. No. 67,832, filed December 29, 1948, and a simplified spring type is disclosed and claimed in my U. S. Patent No. 2,499,210 of February 28, 1950. In practically all of these prior damping devices, there is always a certain lag between the movement of the roller in contact with the film and the action of the damping device, particularly when the damper is a dashpot. The present invention utilizes a damping device which provides instantaneous damping action upon initial movement of the filter roller caused by a change in size or tension of the film loop. The invention also provides a large degree of damping in a small compact unit containing both the tensioning and damping element, both of which may be adjusted to provide the desired filter action for all forms of tape and film drives.

The principal object of the invention, therefore, is to facilitate the uniform advancement of tape or film.

Another object of the invention is to provide an improved filter damper for film advancing apparatus.

A further object of the invention is to provide an improved compact and efficient filter damper which is instantaneous in its action.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
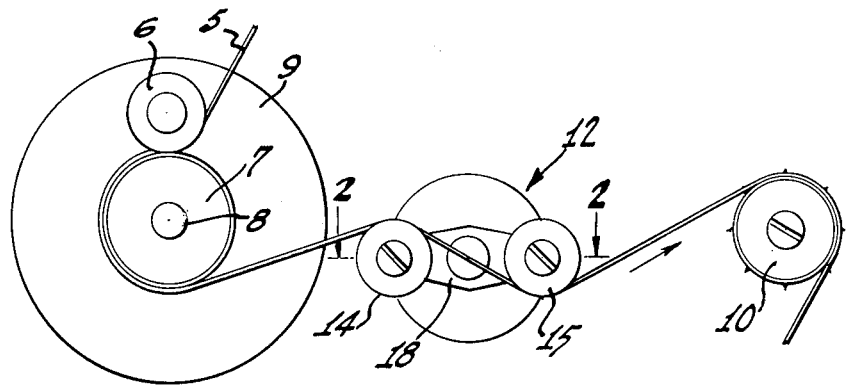
Fig. 1 is an elevational view of the filter invention shown positioned in a film loop.

Referring now to the drawings, in which the same numerals identify like elements, a film 5 is shown passing under a pressure roller 6 and around a film-pulled drum 7, on the shaft 8 of which is a flywheel 9. The film is pulled by a sprocket 10, and, in the loop of the film between the drum 7 and the sprocket 10, is a damping device, shown generally at 12.

Figure 3:
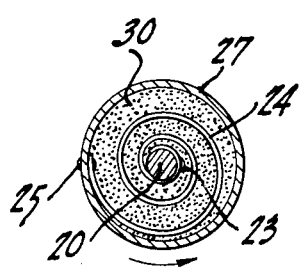
Fig. 3 is a detailed view showing the form of filter elements used in Fig. 2, and taken along the line 3—3 of Fig. 2.
Figure 2:
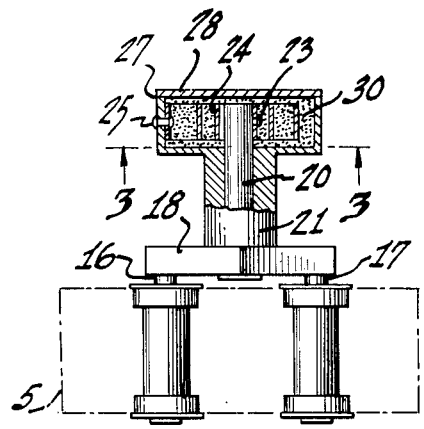
Fig. 2 is a sectional view, partly in cross-section, of the tensioning and damping elements of the filter shown in Fig. 1 and taken along the line 2—2 of Fig. 1.

Referring now to Figs. 1, 2, and 3, the film 5 passes over a roller 14 and under a roller 15, the rollers being mounted on shafts 16 and 17, respectively, which, in turn, are mounted at the ends of an arm 18 attached to a shaft 20. The shaft 20 is pivotable in a bearing bracket 21, and so pivots upon a change in the size and tension of the film loop between the sprocket 10 and drum 7.

At the end of shaft 20, there is attached by a pin 23 a flat spiral spring 24, the other end of which is attached by a pin 25 to the inner surface of an annular casing or housing 27. The housing 27 is closed by a cover plate 28, and the interior of the casing is filled with a damping material of any suitable type, such as silicone, oil, or grease, as shown by the dotted section 30.

The above type of damper is an integral unit which is instantaneous in its action, since an increase in the length of the loop between the sprocket 10 and drum 7 will let the spring 24 rotate the shaft 20 in one direction, and a decrease in the length of the loop will rotate the shaft in the opposite direction against the tension of the spring. Thus, the spring convolutions will expand and contract. However, since the damping material is in contact with all surfaces of the spring, any action of the turns will be immediately affected by the damping material in contact therewith. Thus, an instantaneous action is provided. Furthermore, the construction permits any degree of tensioning action which may be varied by adjustment of the arm 18 on shaft 20 or by varying the position of attachment of the ends of the spring to the shaft 20 and casing 27. The unit may be built in various sizes, depending upon the amount of filter action required.

Figure 4:
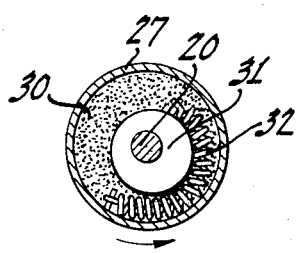
Fig. 4 is a detailed view of a modification of the tensioning element shown in Figs. 2 and 3.

In Fig. 4, a modification of the tensioning element is provided. As shown in this figure, the shaft 20 has mounted thereon a cam collar 31, to which is attached one end of a helical coil spring 32. The other end of the helical spring is attached to the casing 27. The casing is again filled with the damping material 30. The action of the modification shown in Fig. 4 is the same as the spiral spring modification shown in Figs. 2 and 3, since any movement of the shaft in the direction shown by the arrow will stretch the spring, the stretching being immediately damped by the damping material 30. Thus, both modifications combine the filter elements into a single integral unit, the unit having both a resilient element for tensioning the film and a damper element which acts instantaneously on the resilient element.

I claim:

1. A filter unit for obtaining uniform motion of a moving film strip comprising at least one roller adapted to be displayed by changes in film tension, a shaft for said roller, a support for said roller shaft, a shaft for said support adapted to be rotated with displacement of said roller, a resilient element having one end thereof attached to said support shaft for resisting the rotation thereof in one direction, a fixed casing for said resilient element, the other end of said resilient element being attached to said fixed casing, and a damping material within said casing and in contact with the surfaces of said resilient element.

2. A filter unit in accordance with claim 1, in which said resilient element is a spiral spring having one end thereof attached to said support shaft and the other end attached to a point on the inner surface of said fixed casing, said spring being placed under tension by the tension in said film, and said damping material being disposed among the spirals of said spring.

3. A filter unit in accordance with claim 1, in which said resilient element is a helical spring, one end of said spring being attached to said support shaft and the other end of said spring being attached at a point on the inner surface of said casing, and said damping material being disposed among the coils of said spring.

4. A filter unit in accordance with claim 3, in which a cam is provided on said shaft and in contact with the convolutions of said spring for stretching said spring upon rotation of said shaft and cam.

5. A motion filter unit comprising a shaft, a rotatable arm mounted on said shaft, said shaft being rotated by rotation of said arm, a resilient element having one end attached to the surface of said shaft, a housing enclosing said element, the other end of said element being attached to the inner surface of said housing, the central plane of said element cutting all sections of said element being at right angles to the axis of said shaft, and fluid means within said housing immersing said element for damping the rotation of said arm.

6. A motion filter unit in accordance with claim 5, in which said first mentioned means includes a pair of rollers, one of said rollers being mounted on each end of said arm, said arm being connected to said shaft at the center of said arm.

7. A motion filter unit in accordance with claim 6, in which said fluid means is oil.

References Cited in the file of this patent

UNITED STATES PATENTS

| Number | Name | Date |
|---|---|---|
| 959,667 | White | May 31, 1910 |
| 1,777,682 | Sponable | Oct. 7, 1930 |
| 1,892,554 | Kellogg | Dec. 27, 1932 |
| 2,206,380 | Zimmerman | July 2, 1940 |
| 2,359,915 | Hussman | Oct. 10, 1944 |
| 2,499,210 | Bartelson | Feb. 28, 1950 |